United States Patent
Li

(10) Patent No.: US 12,395,230 B2
(45) Date of Patent: Aug. 19, 2025

(54) DEFAULT BEAM DETERMINATION METHOD AND APPARATUS, AND COMMUNICATION DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 5 days.

(21) Appl. No.: 18/550,772

(22) PCT Filed: Mar. 30, 2021

(86) PCT No.: PCT/CN2021/084143
§ 371 (c)(1),
(2) Date: Sep. 15, 2023

(87) PCT Pub. No.: WO2022/205004
PCT Pub. Date: Oct. 6, 2022

(65) Prior Publication Data
US 2024/0187082 A1    Jun. 6, 2024

(51) Int. Cl.
*H04B 7/08*    (2006.01)
*H04B 7/06*    (2006.01)
(Continued)

(52) U.S. Cl.
CPC ........... *H04B 7/088* (2013.01); *H04B 7/0695* (2013.01); *H04L 5/0053* (2013.01); *H04L 5/0091* (2013.01); *H04W 72/231* (2023.01)

(58) Field of Classification Search
CPC .... H04B 7/0695; H04B 7/088; H04B 7/0617; H04B 7/06952; H04B 7/024;
(Continued)

(56) References Cited

U.S. PATENT DOCUMENTS 11,924,842 B2 * 3/2024 Park ................ H04B 7/063
2019/0297640 A1   9/2019 Liou et al.
(Continued)

FOREIGN PATENT DOCUMENTS

CN    109891993 A    6/2019
CN    110167091 A    8/2019
(Continued)

OTHER PUBLICATIONS

International Search Report and Written Opinion of International Application No. PCT/CN2021/084143, dated Jan. 5, 2022, 18 pages.
(Continued)

*Primary Examiner* — Eva Y Puente
(74) *Attorney, Agent, or Firm* — Finnegan, Henderson, Farabow, Garrett & Dunner, L.L.P.

(57) ABSTRACT

A method for determining a default beam is performed by a terminal, and includes: receiving first downlink control information (DCI) carried on a first physical downlink control channel (PDCCH); and determining that a transmission beam is unable to be determined according to the first DCI, and determining a default beam according to one or more transmission configuration indication (TCI) states corresponding to a second PDCCH.

19 Claims, 4 Drawing Sheets receiving a first DCI carried on a first PDCCH — 101 in response to determining that a transmission beam is unable to be determined according to the first DCI, determining a default beam according to one or more TCI states corresponding to a second PDCCH — 102

(51) Int. Cl.
*H04L 5/00* (2006.01)
*H04W 72/231* (2023.01)

(58) Field of Classification Search
CPC .............. H04B 7/0408; H04B 7/0404; H04B 7/06968; H04W 72/23; H04W 72/046; H04W 72/1273; H04W 72/232; H04W 16/28; H04W 72/21; H04W 72/0446; H04W 72/231; H04L 5/0053; H04L 5/0023; H04L 5/0048; H04L 5/0094; H04L 5/0044; H04L 5/0051; H04L 5/0091; H04L 5/001
See application file for complete search history.

(56) References Cited

U.S. PATENT DOCUMENTS

| | | | | |
|---|---|---|---|---|
| 2022/0167324 | A1* | 5/2022 | Baskaran | H04W 72/23 |
| 2023/0171786 | A1* | 6/2023 | Yuan | H04W 72/12 370/329 |
| 2024/0137179 | A1* | 4/2024 | Abebe | H04W 52/42 |

FOREIGN PATENT DOCUMENTS

| | | |
|---|---|---|
| CN | 111212437 A | 5/2020 |
| CN | 111727654 A | 9/2020 |
| WO | 2020142900 A1 | 7/2020 |
| WO | WO 2020/142899 A1 | 7/2020 |

OTHER PUBLICATIONS

The First Office Action for Chinese Application No. 202180000795.4, issued on May 7, 2022, 14 pages.
Moderator (OPPO), "FL summary for Multi-TRP/Panel Transmission", 3GPP TSG RAN WG1 #100bis, R1-2002406, e-Meeting, Apr. 20-30, 2020, 34 pages.
"Enhancements on Multi-TRP for PDCCH, PUCCH and PUSCH", Xiaomi, 3GPP TSG RAN WG1 Meeting #104-e, Tdoc R1-2101093, e-Meeting, Jan. 25-Feb. 5, 2021, 21 pages.
Office Action issued by the Japanese Patent Office on Aug. 9, 2024, in corresponding Application No. JP 2023-559048, 7 pages.
"Further details on Multi-beam and Multi-TRP operation", ZTE, 3GPP TSG RAN WG1 Meeting #102-e, R1-2005461, e- Meeting, Aug. 17-28, 2020, 8 pages.
Office Action issued by the Intellectual Property India Patent Office on Jan. 29, 2025, in corresponding Application No. IN 2023-47070162, 6 pages.
Extended European Search Report Issued in Application No. 21933684.9 dated Dec. 23, 2024, 10 pages.

* cited by examiner

DEFAULT BEAM DETERMINATION METHOD AND APPARATUS, AND COMMUNICATION DEVICE

CROSS REFERENCE TO RELATED APPLICATIONS

This application a U.S. national phase of International Application No. PCT/CN2021/084143, filed on Mar. 30, 2021, the entire contents of which are incorporated herein by reference.

TECHNICAL FIELD

The disclosure relates to a field of wireless communication technologies, in particular to a method for determining a default beam, an apparatus for determining a default beam and a communication device.

BACKGROUND

In New Radio (NR), especially when a communication frequency band is in the frequency range 2, beam-based transmission and reception can be used to ensure signal coverage due to the rapid attenuation of high frequency channels. Currently, a network side device sends a beam indication signaling to a terminal device, and the terminal device determines a sending beam and/or a receiving beam based on the beam indication signaling.

In the R15/16, a beam indication signaling consists of a Medium Access Control-Control Element (MAC CE) signaling and a Downlink Control Information (DCI) signaling. A beam used to transmit a Physical Downlink Shared Channel (PDSCH) is indicated by a Transmission Configuration Indication (TCI) state indication field of the DCI signaling.

However, when DCI carried by a Physical Downlink Control Channel (PDCCH) sent by the network side device does not include the TCI state indication field, how the terminal device determines a transmitting beam is crucial.

SUMMARY

According to a first aspect of the disclosure, a method for determining a default beam is provided. The method includes: receiving a first DCI carried on a first PDCCH; and in response to determining that a transmission beam is unable to be determined according to the first DCI, determining a default beam according to one or more TCI states corresponding to a second PDCCH.

According to a second aspect of the disclosure, another method for determining a default beam is provided. The method includes: sending a first DCI to a terminal device, the first DCI being carried on a first PDCCH; in which, the terminal device determines a transmission beam according to the first DCI, and in response to determining that the transmission beam is unable to be determined according to the first DCI, the terminal device determines a default beam according to one or more TCI states corresponding to a second PDCCH.

According to a third aspect of the disclosure, a communication device, including a transceiver, a memory, and a processor connected to the transceiver and the memory, respectively, is provided. The processor is configured to perform the method for determining a default beam according to the first aspect or the second aspect.

According to a fourth aspect of the disclosure, a computer storage medium having computer executable instructions stored thereon, is provided. When the computer executable instructions are executed by a processor, the method for determining a default beam is performed according to the first aspect or the second aspect.

BRIEF DESCRIPTION OF THE DRAWINGS

Example embodiments of the disclosure will be described in detail below with reference to the accompanying drawings, in which.

DETAILED DESCRIPTION

Figure 1:
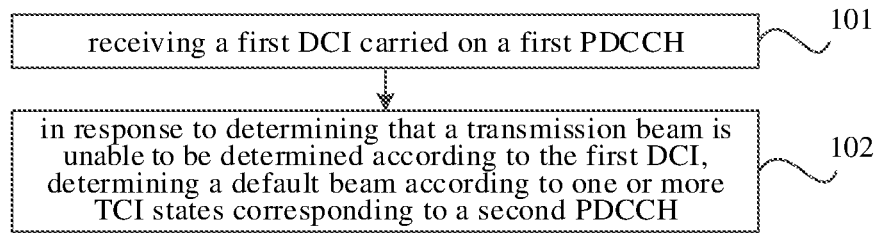
FIG. 1 is a flowchart of a method for determining a default beam provided by an embodiment of the disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The embodiments of the disclosure are described in detail below, and examples of which are illustrated in the accompanying drawings, in which the same or similar symbols indicate the same or similar elements. The embodiments described below with reference to the accompanying drawings are exemplary and are intended to be used to explain the disclosure and are not to be construed as a limitation of the disclosure.

Currently, a beam indication signaling is sent to a terminal device by a network side device, and the terminal device determines a sending beam and/or a receiving beam based on the beam indication signaling.

In the R15/16, a beam indication signaling consists of a Medium Access Control-Control Element (MAC CE) signaling and a Downlink Control Information (DCI) signaling. A beam used to transmit a Physical Downlink Control Channel (PDCCH), a Physical Downlink Shared Channel (PDSCH) or a downlink reference signal (which may also be referred to as transmission configuration indication (TCI) state, Quasi Co-Location (QCL)-Type D) may be indicated by a TCI state indication field of the MAC CE signaling and/or the DCI signaling. A beam used to transmit a physical uplink shared channel (PUSCH), a physical uplink control channel (PUCCH) or an uplink reference signal can be spatialrelationinfo or spatial setting.

However, when there is no TCI state indication field included in the DCI carried by the PDCCH sent by the network side device, or when a time interval between the PDCCH and the PDSCH is less than a preset time duration, the terminal device may be unable to obtain a TCI state of the PDSCH a timely, and at this time, a predefined rule may be used to determine a default beam for transmitting the PDSCH.

In an embodiment of the disclosure, the default beam for transmitting the PDSCH can be determined by the following methods.

In Method 1, the default beam is a beam indicated by a TCI state corresponding to a PDCCH used for scheduling the PDSCH.

In Method 2, the default beam is a beam indicated by a TCI state corresponding to a control resource set (CORESET) with a minimum CORESET ID in a past latest time unit (a slot) in which a SS set (search space set) needs to be monitored.

In Method 3, the CORESET in Method 2 is further defined as having the same CORESETPoolIndex as the CORESET corresponding to the PDCCH used for scheduling the PDSCH, on a premise that a default TCI state of each CORESETPoolIndex is activated.

In Method 4, if two default TCI states are activated, the default beam is a beam indicated by two TCI states corresponding to a minimum codepoint in codepoints each corresponding to two TCI states in a bit field of TCI states indicated by a DCI format. Which codepoint corresponds to two TCI states and which two TCI states correspond to the minimum codepoint can be indicated by the MAC CE signaling.

However, when the CORESET with the minimum CORESET ID is configured with two TCI states, or the PDCCH used for scheduling the PDSCH is configured with two TCI states, how to determine the default beam for transmitting the PDSCH is a problem to be solved.

To solve the above problem, the disclosure provides a method for determining a default beam, an apparatus for determining a default beam and a communication device.

FIG. 1 is a flowchart of a method for determining a default beam provided by an embodiment of the disclosure. The method can be performed by a terminal device.

The terminal device may be a device that provides voice and/or data connectivity to a user, a handheld device with wireless connection function, or any processing device connected to a wireless modem. The name of a user equipment (UE) may also vary in different systems. For example, in a 5G system, the terminal device may be called a UE. A wireless terminal device may communicate with one or more Core Networks (CNs) via a Radio Access Network (RAN). The wireless terminal device may be a mobile terminal device, such as a mobile telephone ("cellular" telephone), or a computer having a mobile terminal device. For example, it may be a portable, pocket-sized, hand-held, computer-built, or vehicle-mounted mobile devices, which can exchange language and/or data with the RAN.

For example, the terminal device can be a Personal Communication Service (PCS) phone, a cordless phone, a Session Initiated Protocol (SIP) phone, a Wireless Local Loop (WLL) station, or a Personal Digital Assistant (PDA). The wireless terminal device can also be referred to as a system, a subscriber unit, a subscriber station, a mobile station, a mobile, a remote station, an access point, a remote terminal, an access terminal, a user terminal, a user agent, and a user device, which is not limited in the embodiments of the disclosure.

As illustrated in FIG. 1, the method for determining a default beam may include the following steps.

At step 101, a first DCI carried on a first PDCCH is received.

In the embodiment of the disclosure, the first DCI may be sent by a network side device.

For example, the network side device is a base station. The base station may include a plurality of cells that provide services to the UE. Depending on the specific application scenario, each cell may contain multiple Transmission Reception Points (TRPs, or Transmit/Receive Points). Each TRP may contain one or more antenna panels, or may be a device that communicates with a wireless terminal device over one or more sectors on a radio interface in the RAN, or may be called other names. For example, the base station involved in the embodiments of the disclosure may be a Base Transceiver Station (BTS) in a Global System for Mobile communications (GSM) or a Code Division Multiple Access (CDMA), a base station (NodeB) in a Wideband Code Division Multiple Access (WCDMA), an evolutional Node B (eNB or e-NodeB) in a long term evolution (LTE) system, a 5G base station (gNB) in a 5G network architecture or a next generation system, a Home evolved Node B (HeNB), a relay node, a femto, or a pico, etc. which is not limited in the embodiments of the disclosure.

In the embodiment of the disclosure, the terminal device may receive the first DCI sent by the network side device, and the first DCI is carried on the first PDCCH.

At step 102, in response to determining that a transmission beam is unable to be determined according to the first DCI, a default beam is determined according to one or more TCI states corresponding to a second PDCCH.

In the embodiment of the disclosure, the default beam may be used to transmit at least one of a PDSCH, a PUSCH, a PUCCH and a reference signal. The reference signal may include a Channel State Information Reference Signal (CSI-RS) or a Sounding Reference Signal (SRS). The reference signal may be a periodic reference signal, an aperiodic reference signal, or a semi-static semi-persistent reference signal.

In the embodiment of the disclosure, the terminal device can determine whether a transmission beam is able to be determined based on the first DCI. If a transmission beam is able to be determined based on the first DCI, the determined transmission beam is used to communicate with the network side device. If a transmission beam is unable to be determined based on the first DCI, the default beam may be determined based on the one or more TCI states corresponding to the second PDCCH. Therefore, the terminal device can determine the default beam even if the DCI does not indicate the transmission beam, and thus it may communicate with the network side device based on the default beam, to improve the communication success rate.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

Figure 2:
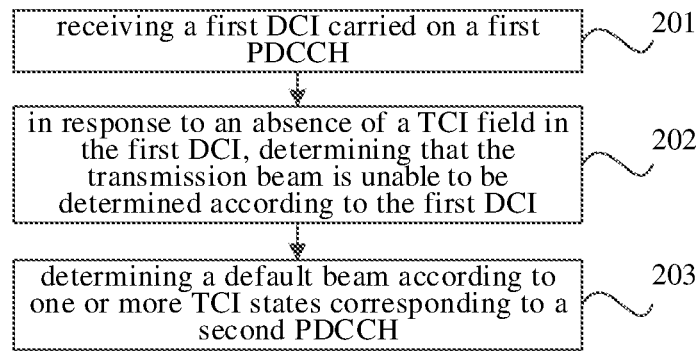
FIG. 2 is a flowchart of a method for determining a default beam provided by an embodiment of the disclosure.

The embodiments of the disclosure provide a method for determining a default beam. FIG. 2 is a flowchart of a method for determining a default beam provided by an embodiment of the disclosure. The method for determining a default beam can be performed by a terminal device. The method for determining a default beam can be performed alone, or in combination with any embodiment or possible implementation of the embodiments in the disclosure, or in combination with any of the technical solutions in the related art.

As illustrated in FIG. 2, the method for determining a default beam includes the following steps.

At step 201, a first DCI carried on a first PDCCH is received.

In the embodiment of the disclosure, step 201 may be realized by using any implementation of the embodiments of the disclosure, which is not limited by the embodiments of the disclosure and will not be repeated.

At step 202, in response to an absence of a TCI field in the first DCI, it is determined that the transmission beam is unable to be determined according to the first DCI.

In the embodiment of the disclosure, in response to the absence of the TCI field (which is also called a TCI state field) in the first DCI, the terminal device determines that the transmission beam is unable to be determined based on the first DCI.

In a possible implementation of the embodiment of the disclosure, in response to the absence of the TCI field (which is also called TCI state field) in the first DCI, and a time interval between the first PDCCH and a corresponding PDSCH being greater than or equal to a preset time duration, the terminal device may determine that the transmission beam is unable to be determined based on the first DCI.

In an embodiment of the disclosure, the preset time duration is set in advance. For example, the preset time duration can be timeduration.

In an embodiment of the disclosure, the preset time duration is configured by the network side device. For example, the preset time duration can be timeduration.

At step 203, a default beam is determined according to one or more TCI states corresponding to a second PDCCH.

In the embodiment of the disclosure, the second PDCCH may be a PDCCH that carries the first DCI, i.e., the second PDCCH may be the same as the first PDCCH.

In the embodiment of the disclosure, the default beam may be determined based on the one or more TCI states corresponding to the second PDCCH.

In a possible implementation of the embodiment of the disclosure, when the second PDCCH corresponds to one TCI state, a beam indicated by the one TCI state can be determined as a default beam.

In a possible implementation of the embodiment of the disclosure, when the second PDCCH corresponds to a plurality of TCI states, one TCI state may be designated from the plurality of TCI states, and a beam indicated by the designated TCI state is determined as a default beam. Or, beams indicated by multiple TCI states in the plurality of TCI states may be determined as a plurality of default beams.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam is unable to be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 3:
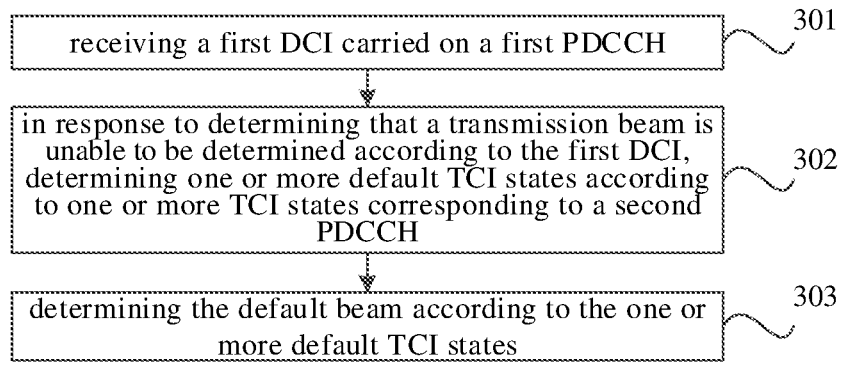
FIG. 3 is a flowchart of a method for determining a default beam provided by an embodiment of the disclosure.

The embodiments of the disclosure also provide a method for determining a default beam. FIG. 3 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 3, the method for determining a default beam includes the following steps.

At step 301, a first DCI carried on a first PDCCH is received.

In the embodiment of the disclosure, step 301 may be realized by using any implementation of the embodiments of the disclosure, which is not limited by the embodiments of the disclosure and will not be repeated.

At step 302, in response to determining that a transmission beam is unable to be determined according to the first DCI, one or more default TCI states are determined according to one or more TCI states corresponding to a second PDCCH.

It should be noted that the process of determining whether or not the transmission beam is able to be determined based on the first DCI in any of the above embodiments is also applicable to this embodiment and is not repeated herein.

In the embodiment of the disclosure, the terminal device may determine the one or more default TCI states based on the one or more TCI states corresponding to the second PDCCH in the event that the transmission beam cannot be determined based on the first DCI.

In a possible implementation of the embodiment of the disclosure, the second PDCCH may correspond to one TCI state, and the one TCI state may be a TCI state of a CORESET corresponding to the second PDCCH. When the second PDCCH corresponds to one TCI state, the one TCI state described above may be determined as a default TCI state.

In a possible implementation of the embodiment of the disclosure, the second PDCCH may correspond to a plurality of TCI states. When the second PDCCH corresponds to a plurality of TCI states, one TCI state may be designated from the plurality of TCI states as a default TCI state. Or, a plurality of default TCI states may be determined based on the above plurality of TCI states.

The designated TCI state is determined as a default TCI state, it can be used for transmission of one communication transmission, or it can be used for transmission of multiple communication transmissions. The communication transmission can include a PDSCH, a PUSCH, a PUCCH, a CSI-RS, and a SRS.

At step 303, the default beam is determined according to the one or more default TCI states.

It should be noted that the explanatory description of the default beam in the previous embodiments is also applicable to this embodiment and will not be repeated herein.

In the embodiment of the disclosure, when the terminal device determines the one or more default TCI states, the default beam may be determined based on the one or more default TCI states. That is, the terminal device may determine a beam indicated by a default TCI state as a default beam.

It should be noted that if there is one default TCI state, one default beam is determined, and the terminal device may communicate with the network side device using the unique default beam. When there is a plurality of default TCI states, a plurality of default beams are determined, and the plurality of default beams are mapped on a plurality of transmission occasions using sequence mapping or cyclic mapping.

A multiplexing method between the plurality of transmission occasions may include at least one of: a Time Division Multiplexing (TDM), a Frequency Division Multiplexing (FDM), and a space division multiplex (SDM). That is, resources occupied by the plurality of transmission occasions differ in at least one of the following dimensions: a time-domain resource, a frequency-domain resource, a space resource (i.e., an antenna port) and a beam direction.

In the embodiment of the disclosure, a value for the terms "multiple" or "the plurality of" is 2. Certainly, it may also be other values, which is not limited in the disclosure. For example, in the following exemplary illustration, the value for the terms "multiple" or "the plurality of" is 2.

As an example, "the plurality of" or "multiple" described above is exemplified by two for illustration. If the default beams are beams indicated by two TCI states (referred to as a first TCI state and a second TCI state, respectively), the cyclic mapping can be used when a plurality of transmission occasions, such as two transmission occasions, are configured. That is, different consecutive transmission occasions correspond to different TCI states. In the following, for example, the default beam is used to transmit a PDSCH. It can be understood that the mapping method between the default beam and the transmission occasion can also be applied to a default beam used for other communication transmissions. For example, there are 4 transmission occasions, that is, a PDSCH may be transmitted for 4 times.

When using the sequence mapping, a beam indicated by the first TCI state can be used to transmit the PDSCH in a first transmission and a second transmission, and a beam indicated by the second TCI state can be used to transmit the PDSCH in a third transmission and a fourth transmission. When using the cyclic mapping, the beam indicated by the first TCI state can be used to transmit the PDSCH in the first transmission and the third transmission, the beam indicated by the second TCI state can be used to transmit the PDSCH in the second transmission and the fourth transmission.

For example, for a terminal device that supports two TCI states simultaneously, such as enableTwoDefaultTCI-States, the PDSCH transmission can be performed by two default beams determined based on two default TCI states (i.e., the first TCI state and the second TCI state), and each default beam corresponds to one transmission occasion when there are 2 transmission occasions. In the TDM mode, when there are more than 2 transmission occasions, the two default beams are mapped on multiple transmission occasions using the sequence mapping or the cyclic mapping.

For example, when the PDSCH is to be transmitted 2 times, a default TCI state corresponds to one transmission occasion. For example, a beam indicated by the first TCI state may be used to transmit the PDSCH in the first transmission, and a beam indicated by the second TCI state may be used to transmit the PDSCH in the second transmission. When a number of PDSCH transmissions is greater than 2, such as when the PDSCH is to be transmitted 4 times, when the using sequence mapping, the beam indicated by the first TCI state may be used to transmit the PDSCH in the first transmission and the second transmission can use, and the beam indicated by the second TCI state may be used to transmit the PDSCH in the third transmission and the fourth transmission. When using the cyclic mapping, the beam indicated by the first TCI state may be used to transmit the PDSCH in the first transmission and the third transmission, the beam indicated by the second TCI state may be used to transmit the PDSCH in the second transmission and the fourth transmission.

It should be noted that the plurality of transmission occasions may be used for repetitive transmissions or non-repetitive transmissions, which is not limited in the disclosure. This may apply to all embodiments of the disclosure.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam is unable to be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 4:
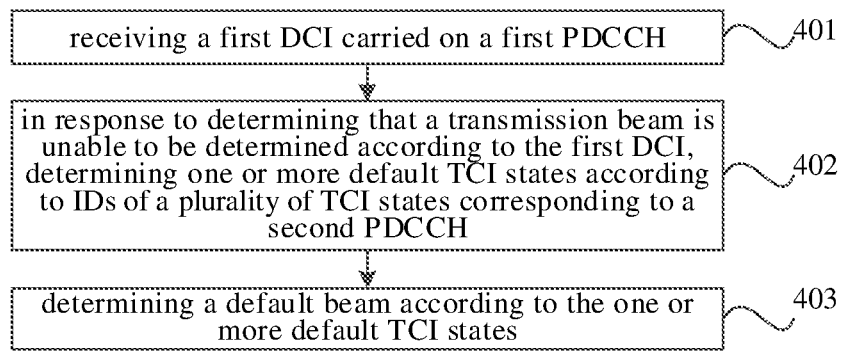
FIG. 4 is a flowchart of a method for determining a default beam provided by an embodiment of the disclosure.

The embodiments of the disclosure also provide a method for determining a default beam. FIG. 4 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 4, the method for determining a default beam includes the following steps.

At step 401, a first DCI carried on a first PDCCH is received.

In the embodiment of the disclosure, step 401 may be realized by using any implementation of the embodiments of the disclosure, which is not limited by the embodiments of the disclosure and will not be repeated.

At step 402, in response to determining that a transmission beam is unable to be determined according to the first DCI, one or more default TCI states are determined according to IDs of a plurality of TCI states corresponding to a second PDCCH.

It should be noted that the process of determining whether or not the transmission beam is able to be determined based on the first DCI in any of the above embodiments is also applicable to this embodiment and is not repeated herein.

In the embodiment of the disclosure, the second PDCCH may correspond to the plurality of TCI states, a value for "the plurality of" is two. Certainly, it may also be any other values, which is not limited in the disclosure.

In a possible implementation of the embodiment of the disclosure, the second PDCCH corresponds to a CORESET and/or a SS set associated with the CORESET. The CORESET corresponds to a plurality of TCI states, and the plurality of TCI states corresponding to the second PDCCH may be the plurality of TCI states corresponding to the CORESET.

As an example, illustration is made by using two as an example of "the plurality of" described above. The second PDCCH is configured with two TCI states. The two TCI states may correspond to the same CORESET, and/or, the two TCI states may correspond to the same SS set. For example, the two TCI states corresponding to the second PDCCH are TCI state #0 and TCI state #1, the TCI state #0 and the TCI state #1 both correspond to CORESET #1, and/or, the TCI state #0 and the TCI state #1 both correspond to SS set #1. The SS set #1 is associated with the CORESET #1.

In a possible implementation of the embodiment of the disclosure, the second PDCCH corresponds to a CORESET and/or a plurality of SS sets associated with the CORESET. The CORESET corresponds to a plurality of TCI states, and the plurality of TCI states corresponding to the second PDCCH may be the plurality of TCI states corresponding to the CORESET.

As an example, illustration is made by using two as an example of "the plurality of" described above. The second PDCCH is configured with two TCI states. The two TCI states may correspond to the same CORESET, and/or, the two TCI states may correspond to different SS sets. For example, the two TCI states corresponding to the second PDCCH are TCI state #0 and TCI state #1, the TCI state #0 and the TCI state #1 both correspond to CORESET #1, and/or, the TCI state #0 corresponds to SS set #0 and the TCI state #1 corresponds to SS set #1. Both the SS set #0 and the SS set #1 are associated with the CORESET #1.

In a possible implementation of the embodiment of the disclosure, the second PDCCH corresponds to a plurality of CORESETs and/or a plurality of SS sets. Each of the plurality of CORESETs corresponds to one TCI state, and the plurality of TCI states corresponding to the second PDCCH may be the plurality of TCI states corresponding to the plurality of CORESETs.

As an example, illustration is made by using two as an example of "the plurality of" described above. The second PDCCH is configured with two TCI states. The two TCI states may correspond to different CORESETs, and/or, the two TCI states may correspond to different SS sets. For example, the two TCI states corresponding to the second PDCCH are TCI state #0 and TCI state #1. The TCI state #0 corresponds to CORESET #0 and the TCI state #1 corresponds to CORESET #1, and/or, the TCI state #0 corresponds to SS set #0 and the TCI state #1 corresponds to SS set #1, in which the SS set #0 is associated with the CORESET #0 and the SS set #1 is associated with the CORESET #1.

In a possible implementation of the embodiment of the disclosure, the terminal device may determine one default TCI state based on the IDs of the plurality of TCI states corresponding to the second PDCCH in case that the transmission beam is unable to be determined based on the first DCI.

As an example, the terminal device may determine a TCI state with a minimum ID according to the IDs of the plurality of TCI states corresponding to the second PDCCH, determine the TCI state with the minimum ID as a designated TCI state, and determine the designated TCI state as the default TCI state.

In a possible implementation of the embodiment of the disclosure, the terminal device may determine a plurality of default TCI states according to the IDs of the plurality of TCI states corresponding to the second PDCCH in case that the transmission beam is unable to be determined based on the first DCI.

As an example, illustration is made by using two as an example of "the plurality of" described above. The second PDCCH is configured with two TCI states, thus the two TCI states can be determined as two default TCI states. That is, regardless of the sizes of the IDs of the TCI states, all TCI states corresponding to the second PDCCH are determined as the default TCI states.

At step 403, a default beam is determined according to the one or more default TCI states.

In the embodiment of the disclosure, step 403 may be realized by using any implementation of the embodiments of the disclosure, which is not limited by the embodiments of the disclosure and will not be repeated.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 5:
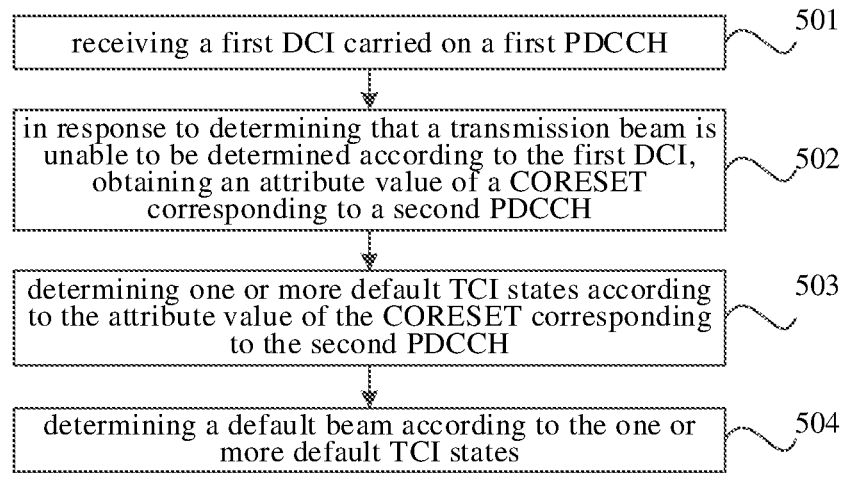
FIG. 5 is a flowchart of a method for determining a default beam provided by an embodiment of the disclosure.

The embodiments of the disclosure also provide a method for determining a default beam. FIG. 5 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 5, the method for determining a default beam includes the following steps.

At step 501, a first DCI carried on a first PDCCH is received.

In the embodiment of the disclosure, step 501 may be realized by using any implementation of the embodiments of the disclosure, which is not limited by the embodiments of the disclosure and will not be repeated.

At step 502, in response to determining that a transmission beam is unable to be determined according to the first DCI, an attribute value of a CORESET corresponding to a second PDCCH is obtained.

It should be noted that the process of determining whether or not the transmission beam is able to be determined based on the first DCI in any of the above embodiments is also applicable to this embodiment and is not repeated herein.

In the embodiment of the disclosure, there may be one second PDCCH. Or, there may be multiple second PDCCHs, that is, multiple second PDCCH transmission occasions transmit the same DCI signaling, which is not limited in the disclosure. When there are multiple second PDCCHs, the multiple second PDCCHs may be PDCCHs with the same time-frequency resources but different beams, or PDCCHs with different time-domain resources, or PDCCHs with different frequency-domain resources, which is not limited herein.

In the embodiment of the disclosure, in response to determining that the transmission beam cannot be determined based on the first DCI, the terminal device can obtain the attribute value of the CORESET corresponding to the second PDCCH. Optionally, the attribute value of the CORESET includes at least one of the followings: a CORESET ID; an ID of a SS set associated with the CORESET; and a pool index (e.g., CORESETPoolindex) of the CORESET.

At step 503, one or more default TCI states are determined according to the attribute value of the CORESET corresponding to the second PDCCH.

In a possible implementation of the embodiment of the disclosure, the terminal device may determine a default TCI state based on the attribute value of the CORESET corresponding to the second PDCCH. For example, the terminal device may determine a designated TCI state based on the attribute value of the CORESET corresponding to the second PDCCH, and determine the designated TCI state as the default TCI state.

In a possible implementation of the embodiment of the disclosure, the terminal device may determine a plurality of TCI states based on the attribute value of the CORESET corresponding to the second PDCCH.

In a possible implementation, when the attribute value of the CORESET is an ID of the CORESET, the terminal device may determine one or more default TCI states based on the ID of the CORESET corresponding to the second PDCCH.

As an example, the terminal device may determine a CORESET with a minimum ID based on IDs of CORESETs corresponding to the second PDCCH, and determine a TCI state corresponding to the CORESET with the minimum ID as a designated TCI state, thus the designated TCI state may be determined as the default TCI state.

For example, illustration is made by using two as an example of "the plurality of" described above. The second PDCCH is configured with two TCI states, which may correspond to different CORESETs. For example, the two TCI states corresponding to the second PDCCH are TCI state #0 and TCI state #1, and the TCI state #0 corresponds to CORESET #0 and the TCI state #1 corresponds to CORESET #1, thus a TCI state corresponding to a CORESET with a minimum ID in the CORESET #0 and the CORESET #1 is determined as a designated TCI state, which can be used as a default TCI state.

As an example, the terminal device may determine a plurality of default TCI states according to the IDs of the CORESETs corresponding to the second PDCCH.

For example, illustration is made by using two as an example of "the plurality of" described above. The second PDCCH is configured with two TCI states, the two TCI states can be determined as two default TCI states. That is, regardless of the sizes of the IDs of the CORESETs, the TCI states corresponding to all CORESETs corresponding to the second PDCCH are determined as the default TCI states.

In another possible implementation, when the attribute value of the CORESET is an ID of a SS set associated with the CORESET, the terminal device may determine one or more default TCI states based on the ID of the SS set associated with the CORESET corresponding to the second PDCCH.

As an example, the terminal device may determine a SS set with a minimum ID based on IDs of SS sets associated with the CORESET corresponding to the second PDCCH, and determine a TCI state corresponding to the SS set with the minimum ID as a designated TCI state, thus the designated TCI state can be determined as a default TCI state.

For example, illustration is made by using two as an example of "the plurality of" described above. The second PDCCH is configured with two TCI states, which correspond to the same CORESET, but to different SS sets. For example, the two TCI states corresponding to the second PDCCH are TCI state #0 and TCI state #1. The TCI state #0 and the TCI state #1 both correspond to CORESET #1. The TCI state #0 corresponds to SS set #0 and the TCI state #1 corresponds to SS set #1. Thus, the TCI state corresponding to the SS set with the minimum ID in the SS set #0 and the SS set #1 can be determined as the designated TCI state, and the designated TCI state is determined as the default TCI state.

As an example, the terminal device may determine a plurality of default TCI states according to the IDs of the SS sets associated with the CORESET corresponding to the second PDCCH.

For example, illustration is made by using two as an example of "the plurality of" described above. The second PDCCH is configured with two TCI states. The two TCI states can be determined as two default TCI states. That is, regardless of the sizes of the IDs of the SS sets, the TCI states corresponding to all the SS sets associated with the CORESET corresponding to the second PDCCH are determined as the default TCI states.

As another possible implementation, when the attribute value of the CORESET is a CORESETPoolindex of the CORESET, the terminal device may determine one or more default TCI states based on the CORESETPoolindex of the CORESET corresponding to the second PDCCH.

As an example, the terminal device may determine a CORESET with a minimum CORESETPoolindex based on CORESETPoolindexes of CORESETs corresponding to the second PDCCH, and determine a TCI state corresponding to the CORESET with the minimum CORESETPoolindex as the designated TCI state, thus the designated TCI state can be determined as a default TCI state. Or, the TCI state corresponding to the minimum CORESETPoolindex is determined as a designated TCI state, and the designated TCI state is determined as a default TCI state.

For example, illustration is made by using two as an example of "the plurality of" described above. The second PDCCH is configured with two TCI states, which correspond to different CORESETs, or correspond to different CORESETPoolindexes. A TCI state corresponding to a CORESET with a smaller CORESETPoolindex may be determined as a default TCI state, or, a TCI state corresponding to the smaller CORESETPoolindex may be determined as a designated TCI state, and this designated TCI state is determined as a default TCI state.

As an example, the terminal device may determine a plurality of default TCI states based on the CORESETPoolindexes of the CORESETs corresponding to the second PDCCH.

For example, illustration is made by using two as an example of "the plurality of" described above. The second PDCCH is configured with two TCI states, and these two TCI states are determined as two default TCI states. That is, regardless of the value of CORESETPoolindex, the TCI states corresponding to all CORESETPoolindexes corresponding to the second PDCCH are determined as the default TCI states.

At step 504, a default beam is determined according to the one or more default TCI states.

In the embodiment of the disclosure, step 504 may be realized by using any implementation of the embodiments of the disclosure, which is not limited by the embodiments of the disclosure and will not be repeated.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 6:
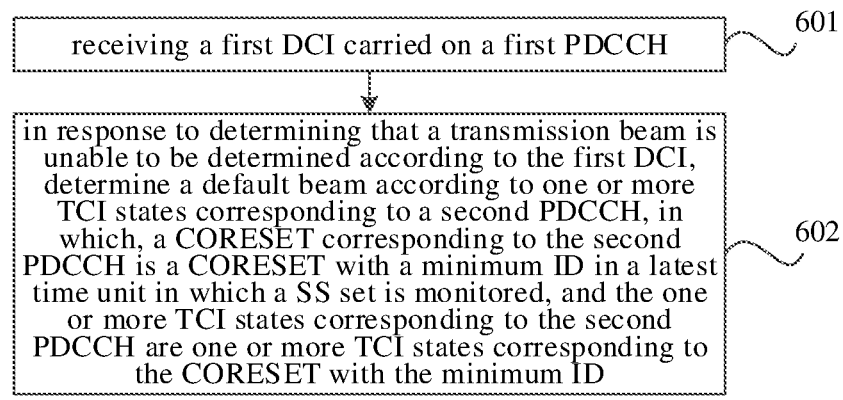
FIG. 6 is a flowchart of a method for determining a default beam provided by an embodiment of the disclosure.

The embodiments of the disclosure provide a method for determining a default beam. FIG. 6 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 6, the method for determining a default beam includes the following steps.

At step 601, a first DCI carried on a first PDCCH is received.

In the embodiment of the disclosure, step 601 may be realized by using any implementation of the embodiments of the disclosure, which is not limited by the embodiments of the disclosure and will not be repeated.

At step 602, in response to determining that a transmission beam is unable to be determined according to the first DCI, a default beam is determined according to one or more TCI states corresponding to a second PDCCH, in which, a CORESET corresponding to the second PDCCH is a CORESET with a minimum ID in a latest time unit in which a SS set is monitored, and the one or more TCI states corresponding to the second PDCCH are one or more TCI states corresponding to the CORESET with the minimum ID.

It should be noted that the process of determining whether or not the transmission beam is able to be determined based on the first DCI in any of the above embodiments is also applicable to this embodiment and is not repeated herein.

In the embodiment of the disclosure, in response to determining that the transmission beam cannot be determined based on the first DCI, the terminal device can determine a CORESET with a minimum ID in the latest time unit in which a SS set is monitored, and one or more TCI states corresponding to the CORESET with the minimum ID are determined as one or more default TCI states. The beam indicated by the default TCI state is determined as the default beam.

As an example, when the CORESET with the minimum ID corresponds to one TCI state, the TCI state is determined as a default TCI state, and a beam indicated by the default TCI state is determined as a default beam.

As an example, when the CORESET with the minimum ID corresponds to a plurality of TCI states, one TCI state may be designated from the plurality of TCI states, and the designated TCI state is determined as a default TCI state. A beam indicated by the default TCI state is determined as a default beam. Or, multiple default TCI states may be determined from the plurality of TCI states, and beams indicated by the multiple default TCI states may be determined as multiple default beams.

It should be noted that when the CORESET with the minimum ID corresponds to a plurality of TCI states, the execution process of determining one or more default TCI states based on the plurality of TCI states can be referred to any of the above embodiments and will not be repeated herein.

In a possible implementation of the embodiment of the disclosure, a CORESETPoolindex of the CORESET with the minimum ID may be identical to a CORESETPoolindex of a CORESET corresponding to the first PDCCH.

Optionally, the terminal device can determine the CORESET with the minimum ID in the latest time unit in which the SS set is monitored, determine one or more TCI states corresponding to the CORESET with the minimum ID as one or more default TCI states, and determine beams indicated by the one or more default TCI states as one or more default beams. The CORESETPoolindex of the CORESET with the minimum ID is identical to the CORESETPoolindex of the CORESET corresponding to the first PDCCH on the premise that a time interval between the first PDCCH and a corresponding PDSCH is less than the preset time duration or that the first DCI does not contain a TCI state field.

In a possible implementation of the embodiment of the disclosure, the CORESET with the minimum ID may be a CORESET with a minimum ID in CORESETs each corresponding to one TCI state.

That is, in the disclosure, the terminal device may determine a CORESET with a minimum ID and configured with only one TCI state in the latest time unit in which the SS set is monitored, and the one TCI state corresponding to the CORESET is determined as a default TCI state. A beam indicated by the default TCI state is determined as a default beam.

In a possible implementation of the embodiment of the disclosure, the CORESET with the minimum ID may be a CORESET with the minimum ID in CORESETs each corresponding to one TCI state, and a CORESETPoolindex of the CORESET with the minimum ID may be identical to the CORESETPoolindex of the CORESET corresponding to the first PDCCH.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 7:
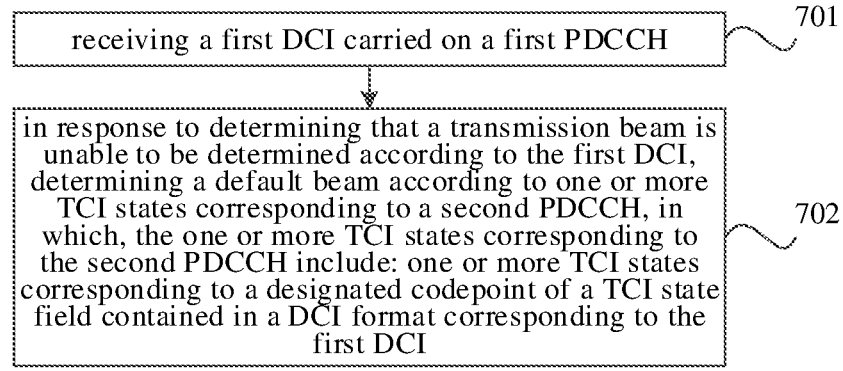
FIG. 7 is a flowchart of a method for determining a default beam provided by an embodiment of the disclosure.

The embodiments of the disclosure provide a method for determining a default beam. FIG. 7 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 7, the method for determining a default beam includes the following steps.

At step 701, a first DCI carried on a first PDCCH is received.

In the embodiment of the disclosure, step 701 may be realized by using any implementation of the embodiments of the disclosure, which is not limited by the embodiments of the disclosure and will not be repeated.

At step 702, in response to determining that a transmission beam is unable to be determined according to the first DCI, a default beam is determined according to one or more TCI states corresponding to a second PDCCH, in which, the one or more TCI states corresponding to the second PDCCH include: one or more TCI states corresponding to a designated codepoint of a TCI state field contained in a DCI format corresponding to the first DCI.

It should be noted that the process of determining whether or not the transmission beam is able to be determined based on the first DCI in any of the above embodiments is also applicable to this embodiment and is not repeated herein.

In a possible implementation of the embodiment of the disclosure, the designated codepoint may be a minimum codepoint in a plurality of codepoints.

In a possible implementation of the embodiment of the disclosure, the designated codepoint may be a minimum codepoint in a plurality of codepoints each corresponding to a TCI state.

In a possible implementation of the embodiment of the disclosure, the designated codepoint may be a minimum codepoint in a plurality of codepoints each corresponding to two TCI states.

In the embodiment of the disclosure, the TCI state field may be used to indicate a beam at least one type of communication transmission.

In the embodiment of the disclosure, the first DCI may not carry a TCI state field (which is also called a TCI state indication field), but an MAC CE signaling has activated a correspondence between one or more TCI states and the designated codepoint of the TCI state field included in the DCI format corresponding to the first DCI. Therefore, in the embodiment of the disclosure, when the terminal device is unable to determine the transmission beam based on the first DCI, the default beam may be determined based on the one or more TCI states corresponding to the designated codepoint of the TCI state field contained in the DCI format corresponding to the first DCI.

The TCI state corresponding to each codepoint can be indicated by the MAC CE signaling. That is, one or more TCI states corresponding to each codepoint can be determined based on the MAC CE.

It is noted that the execution of the process of determining the default beam based on the one or more TCI states can be referred to any of the above embodiments and will not be repeated herein.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Figure 8:
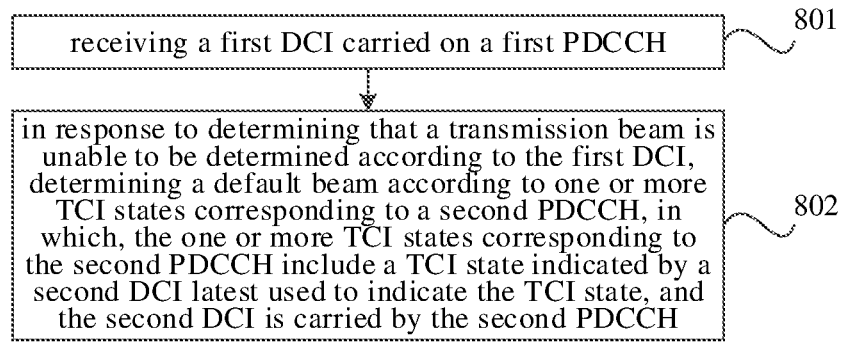
FIG. 8 is a flowchart of a method for determining a default beam provided by an embodiment of the disclosure.

The embodiments of the disclosure provide a method for determining a default beam. FIG. 8 is a flowchart of a method for determining a default beam provided by an embodiment of the disclosure. This method can be performed by a terminal device. The method can be performed alone, or in combination with any embodiment or possible implementation of the embodiments in the disclosure, or in combination with any of the technical solutions in the related art.

As illustrated in FIG. 8, the method for determining a default beam includes the following steps.

At step 801, a first DCI carried on a first PDCCH is received.

At step 802, in response to determining that a transmission beam is unable to be determined according to the first DCI, a default beam is determined according to one or more TCI states corresponding to a second PDCCH, in which, the one or more TCI states corresponding to the second PDCCH include a TCI state indicated by a second DCI latest used to indicate the TCI state, and the second DCI is carried by the second PDCCH.

It should be noted that the process of determining whether or not the transmission beam is able to be determined based on the first DCI in any of the above embodiments is also applicable to this embodiment and is not repeated herein.

In the embodiment of the disclosure, when the terminal device is unable to determine the transmission beam based on the first DCI, it can determine a TCI state indicated by the second DCI most recently used to indicate a TCI state, and the default beam is determined based on the TCI state indicated by the second DCI most recently used to indicate a TCI state. For example, the TCI state indicated by the second DCI most recently used to indicate a TCI state is determined as a default TCI state, and a beam indicated by the default TCI state is determined as the default beam.

The TCI state indicated by the second DCI may be referred to as a general TCI state, and a beam indicated by the general TCI state may be referred to as a general beam. The general beam may include an uplink and downlink general beam, an uplink general beam, or a downlink general beam. The uplink and downlink general beam is a beam used for uplink transmission and downlink transmission. The uplink general beam is a beam used for uplink transmission and not for downlink transmission. The downlink general beam is a beam used for downlink transmission and not for uplink transmission.

The general TCI state means that this TCI state is applicable to all communication transmissions within a general beam group. The communication transmissions include uplink communication transmissions and downlink communication transmissions. The uplink communication transmission may include: a PUCCH, a PUSCH, a SRS, and a DeModulation Reference Signal (DMRS). The downlink communication transmission may include a PDCCH, a PDSCH, and a CSI-RS.

In the case where the default beam is used for the uplink communication transmission, the one or more TCI states corresponding to the second PDCCH may be TCI states corresponding to an uplink and downlink general beam or an uplink general beam. In the case where the default beam is used for the downlink communication transmission, the one or more TCI states corresponding to the second PDCCH may be TCI states corresponding to the uplink and downlink general beam or a downlink general beam.

A codepoint of the general beam can indicate one TCI state, or multiple TCI states (such as two TCI states). When the codepoint of the general beam indicates one TCI state, the TCI state can be determined as a default TCI state, and a beam indicated by the default TCI state can be determined as a default beam. When the codepoint of the general beam indicates a plurality of TCI states, one or more default TCI states may be determined based on the plurality of TCI states, and one or more beams indicated by the one or more default TCI states may be determined as one or more default beams. It is noted that the execution process of determining the one or more default TCI states based on the plurality of TCI states can be referred to any of the above embodiments and will not be repeated herein.

With the method for determining a default beam according to the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

As an example, the communication transmission is the PDSCH transmission. According to any of the above embodiments of the disclosure, a default beam for transmitting the PDSCH is determined, so that it is possible to enable the PDSCH transmission between the network side device and the terminal device to use the same beam, to improve the success rate of the PDSCH transmission.

Figure 9:
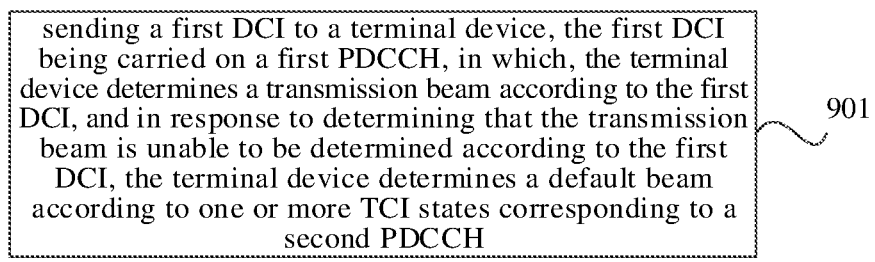
FIG. 9 is a flowchart of a method for determining a default beam provided by an embodiment of the disclosure.

The embodiments of the disclosure provide a method for determining a default beam. FIG. 9 is a flowchart of a method for determining a default beam provided by an embodiment of the disclosure. This method can be performed by a network side device. The method can be performed alone, or in combination with any embodiment or possible implementation of the embodiments in the disclosure, or in combination with any of the technical solutions in the related art.

As illustrated in FIG. 9, the method for determining a default beam includes the following steps.

At step 901, a first DCI is sent to a terminal device, the first DCI being carried on a first PDCCH, in which, the terminal device determines a transmission beam according to the first DCI, and in response to determining that a transmission beam is unable to be determined according to the first DCI, the terminal device determines a default beam according to one or more TCI states corresponding to a second PDCCH.

It is noted that the explanatory description of the method executed by the terminal device in any of the above embodiments of FIGS. 1 to 8 is also applicable to the method executed by the network side device in this embodiment, the implementation principles are similar and will not be repeated herein.

With the method for determining a default beam according to the embodiment of the disclosure, the network side device sends the first DCI carried on the first PDCCH to the terminal device, and the terminal device determines the transmission beam according to the first DCI, and the default beam is determined based on the one or more TCI states corresponding to the second PDCCH in response to determining that the transmission beam is unable to be determined based on the first DCI. Therefore, the terminal device can determine the default beam even if the DCI does not indicate the transmission beam, and thus it may communicate with the network side device based on the default beam, to improve the communication success rate.

It should be noted that these possible implementations described above may be performed alone or in combination, which is not limited in the embodiments of the disclosure.

Corresponding to the method for determining a default beam provided in the above embodiments of FIGS. 1 to 8, the disclosure also provides an apparatus for determining a default beam. Since the apparatus for determining a default beam provided in the embodiments of the disclosure corresponds to the method for determining a default beam provided in the above embodiments of FIGS. 1 to 8, the implementation mode of the method for determining a default beam is also applicable to the apparatus for determining a default beam provided in the embodiments of the disclosure and will not be described in detail in the embodiments of the disclosure.

Figure 10:
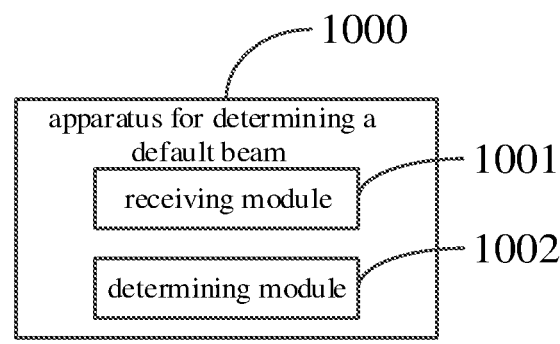
FIG. 10 is a block diagram of an apparatus for determining a default beam provided by an embodiment of the disclosure.

FIG. 10 is a block diagram of an apparatus for determining a default beam provided by an embodiment of the disclosure. The apparatus may be performed by a terminal device.

As illustrated in FIG. 10, the apparatus 1000 may include: a receiving module 1001 and a determining module 1002.

The receiving module 1001 is configured to receive a first DCI carried on a first PDCCH.

The determining module 1002 is configured to, in response to determining that a transmission beam is unable to be determined according to the first DCI, determine a default beam according to one or more TCI states corresponding to a second PDCCH.

Optionally, in response to an absence of a TCI field in the first DCI, it is determined that the transmission beam is unable to be determined according to the first DCI.

Optionally, the determining module 1002 is configured to: determine one or more default TCI states according to the one or more TCI states corresponding to the second PDCCH, and determine the default beam according to the one or more default TCI states.

Optionally, the second PDCCH corresponds to a TCI state, and the TCI state is a TCI state corresponding to a CORESET corresponding to the second PDCCH.

Optionally, that the second PDCCH corresponds to a plurality of TCI states includes at least one of: the second PDCCH corresponding to a CORESET and/or a SS set associated with the CORESET, in which the CORESET corresponds to a plurality of TCI states, and the plurality of TCI states corresponding to the PDCCH are the plurality of TCI states corresponding to the CORESET; the second PDCCH corresponding to a CORESET and/or a plurality of SS sets associated with the CORESET, in which the CORESET corresponds to a plurality of TCI states, and the plurality of TCI states corresponding to the PDCCH are the plurality of TCI states corresponding to the CORESET; and the second PDCCH corresponding to a plurality of CORESETs and/or a plurality of SS sets, in which each of the plurality of CORESETs corresponds to one TCI state, and the plurality of TCI states corresponding to the PDCCH are the plurality of TCI states corresponding to the plurality of CORESETs.

Optionally, the determining module 1002 is configured to: determine the one or more default TCI states based on IDs of the plurality of TCI states corresponding to the second PDCCH.

Optionally, the determining module 1002 is configured to: obtain an attribute value of a CORESET corresponding to the second PDCCH, and determine the one or more default TCI states according to the attribute value of the CORESET corresponding to the second PDCCH.

Optionally, the attribute value of the CORESET includes at least one of: a CORESET ID; an ID of a SS set associated with the CORESET; and a CORESETPoolindex of the CORESET.

Optionally, there are a plurality of default TCI states, a plurality of default beams are mapped on a plurality of transmission occasions using sequence mapping or cyclic mapping. Optionally, the second PDCCH is the first PDCCH.

Optionally, the CORESET corresponding to the second PDCCH is a CORESET with a minimum ID in a latest time unit in which a SS set is monitored, and the one or more TCI states corresponding to the second PDCCH are one or more TCI states corresponding to the CORESET with the minimum ID.

Optionally, at least one of the following is included. A CORESETPoolindex of the CORESET with the minimum ID is identical to a CORESETPoolindex of a CORESET corresponding to the first PDCCH, or, the CORESET with the minimum ID is a CORESET with a minimum ID in a plurality of CORESETs each corresponding to one TCI state.

Optionally, the one or more TCI states corresponding to the second PDCCH include: one or more TCI states corresponding to a designated codepoint of a TCI state field included in a DCI format corresponding to the first DCI.

Optionally, the designated codepoint includes one of: a minimum codepoint in a plurality of codepoints; a minimum codepoint in a plurality of codepoints each corresponding to a TCI state; and a minimum codepoint in a plurality of codepoints each corresponding to two TCI states.

Optionally, the one or more TCI states corresponding to the second PDCCH include: a TCI state indicated by a second DCI most recently used to indicate the TCI state, in which the second DCI is carried by the second PDCCH.

With the apparatus for determining a default beam of the embodiment of the disclosure, the terminal device receives the first DCI carried on the first PDCCH, and determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

Corresponding to the method for determining a default beam provided in the above embodiment of FIG. 9, the disclosure also provides an apparatus for determining a default beam. Since the apparatus for determining a default beam provided in the embodiments of the disclosure corresponds to the method for determining a default beam provided in the above embodiment of FIG. 9, the implementation mode of the method for determining a default beam is also applicable to the apparatus for determining a default beam provided in the embodiments of the disclosure and will not be described in detail in the embodiments of the disclosure.

Figure 11:
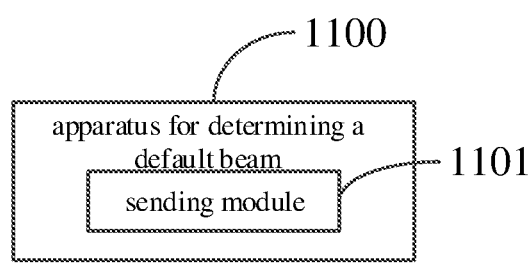
FIG. 11 is a block diagram of an apparatus for determining a default beam provided by an embodiment of the disclosure.

FIG. 11 is a block diagram of an apparatus for determining a default beam provided by an embodiment of the disclosure. The apparatus can be performed by a network side device.

As illustrated in FIG. 11, the apparatus 1100 may include a sending module 1101.

The sending module 1101 is configured to send a first DCI to a terminal device, the first DCI being carried on a first PDCCH, in which, the terminal device determines a transmission beam according to the first DCI, and in response to determining that a transmission beam is unable to be determined according to the first DCI, the terminal device determines a default beam according to one or more TCI states corresponding to a second PDCCH.

With the apparatus for determining a default beam of the embodiment of the disclosure, the network side device sends the first DCI carried on the first PDCCH to the terminal device. The terminal device determines a transmission beam according to the first DCI, and the terminal device determines the default beam based on the one or more TCI states corresponding to the second PDCCH in response to determining that the transmission beam cannot be determined based on the first DCI. Therefore, the terminal device can determine the default beam even if the DCI does not indicate the transmission beam, and thus it may communicate with the network side device based on the default beam, to improve the communication success rate.

In order to realize the above embodiments, the disclosure also provides a communication device.

The communication device provided by the embodiments of the disclosure includes a processor, a transceiver, a memory, and executable programs stored on the memory and capable of being run by the processor. When the executable programs are running by the processor, the above method is implemented.

The communication device may be the terminal device or the network side device as described above.

The processor may include various types of storage mediums that are non-transitory computer storage mediums capable of continuing to memorize information stored thereon after the communication device is powered down. The communication device includes a terminal device or a network side device.

The processor may be connected to the memory via a bus, for reading executable programs stored on the memory, as shown in at least one of FIGS. 1 to 9.

In order to realize the above embodiments, the disclosure also provides a computer storage medium.

The computer storage medium provided by the embodiments of the disclosure has executable programs stored thereon. When the executable programs are executed by a processor, the method of any of the above embodiments is implemented, as shown in at least one of FIGS. 1 to 9.

Figure 12:
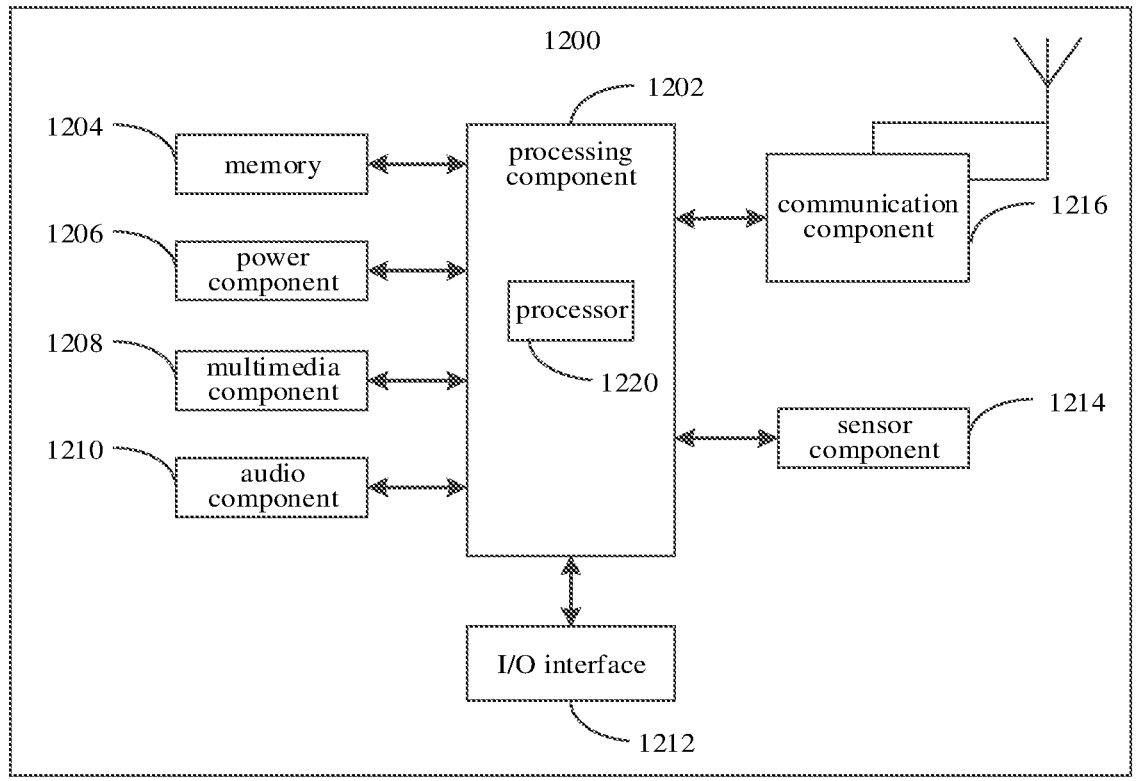
FIG. 12 is a block diagram of a terminal device provided by an embodiment of the disclosure.

FIG. 12 is a block diagram of a terminal device 1200 provided by an embodiment of the disclosure. For example, the terminal device 1200 may be a mobile phone, a computer, a digital broadcasting UE, a message transceiver device, a game console, a tablet device, a medical device, a fitness device, and a personal digital assistant.

As illustrated in FIG. 12, the terminal device 1200 may include at least one of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal device 1200, such as the operations associated with display, telephone calls, data communications, camera operations, and recording operations. The processing component 1202 may include at least one processor 1220 to perform all or part of the steps in the above described methods. Moreover, the processing component 1202 may include at least one module which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the terminal device 1200. Examples of such data include instructions for any applications or methods operated on the terminal device 1200, contact data, phonebook data, messages, pictures, video, etc. The memory 1204 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 1206 provides power to various components of the terminal device 1200. The power component 1206 may include a power management system, at least one power source, and any other components associated with the generation, management, and distribution of power in the terminal device 1200.

The multimedia component 1208 includes a screen providing an output interface between the terminal device 1200 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensor may not only sense a boundary of a touch or swipe action, but also sense a period of wakeup time and a pressure associated with the touch or swipe action. In some embodiments, the multimedia component 1208 includes a front-facing camera and/or a rear-facing camera. When the terminal device 1200 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 1210 is configured to output and/or input audio signals. For example, the audio component 1210 includes a microphone (MIC) configured to receive an external audio signal when the terminal device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes at least one sensor to provide status assessments of various aspects of the terminal device 1200. For instance, the sensor component 1214 may detect an open/closed status of the terminal device 1200, relative positioning of components, e.g., the display and the keypad, of the terminal device 1200, a change in position of the terminal device 1200 or a component of the terminal device 1200, a presence or absence of a user contact with the terminal device 1200, an orientation or an acceleration/deceleration of the terminal device 1200, and a change in temperature of the terminal device 1200. The sensor component 1214 may include a proximity sensor configured to detect the presence of nearby objects without any physical contact. The sensor component 1214 may also include a light sensor, such as a Complementary Metal Oxide Semiconductor (CMOS) or Charge-Coupled Device (CCD) image sensor, for using in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the terminal device 1200 and other devices. The terminal device 1200 can access a wireless network based on a communication standard, such as Wi-Fi, 2G or 3G, or a combination thereof. In an embodiment, the communication component 1216 receives a broadcast signal from an external broadcast management system or broadcast associated information via a broadcast channel. In an embodiment, the communication component 1216 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the terminal device 1200 may be implemented by at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described methods as illustrated in any of FIG. 1 to FIG. 8.

In the embodiments, there is also provided a non-transitory computer readable storage medium including instructions, such as the memory 1204, executable by the processor 1220 in the terminal device 1200, for performing the above method of any of FIG. 1 to FIG. 8. For example, the non-transitory computer-readable storage medium may be a ROM, a Random Access Memory (RAM), a CD-ROM, a magnetic tape, a floppy disc, and an optical data storage device.

Figure 13:
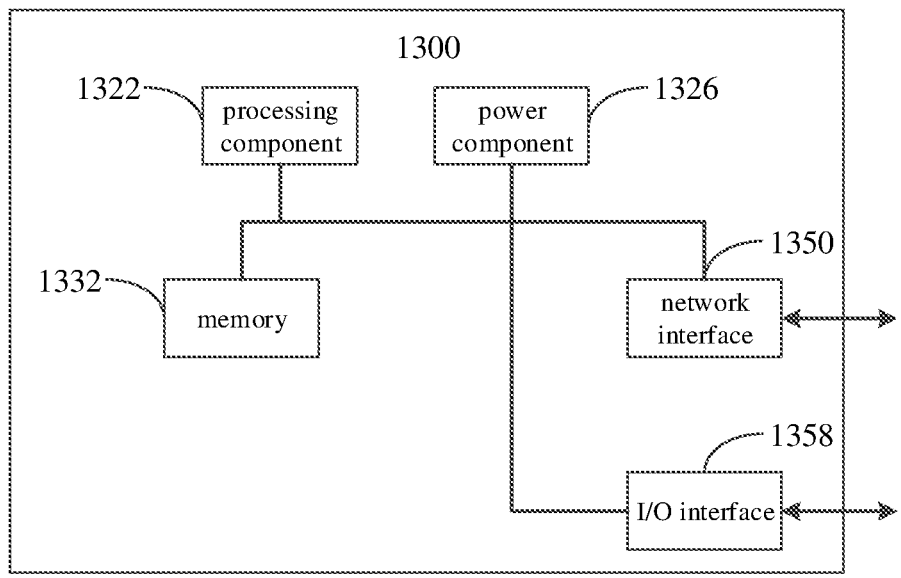
FIG. 13 is a schematic diagram of a network side device provided by an embodiment of the disclosure.

FIG. 13 is a schematic diagram of a network side device provided by an embodiment of the disclosure. As illustrated in FIG. 13, a network side device 1300 includes a processing component 1322 consisting of at least one processor, and memory resources represented by a memory 1332 for storing instructions that may be executed by the processing component 1322, such as applications. The applications stored in the memory 1332 may include one or more modules each corresponding to a set of instructions. In addition, the processing component 1322 is configured to execute the instructions to perform any of the methods described above that are performed by the network device, for example, the method shown in FIG. 9.

The network side device 1300 may also include a power component 1326 configured to perform power management of the network side device 1300, a wired or wireless network interface 1350 configured to connect the network side device 1300 to a network, and an input-output (I/O) interface 1358. The network side device 1300 may operate based on an operating system stored in the memory 1332, such as Windows Server™, Mac OS X™, Unix™, Linux™, FreeBSD™, or the like.

Other implementations of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a default beam, performed by a terminal, the method comprising:
   receiving first downlink control information (DCI) carried on a first physical downlink control channel (PDCCH); and
   determining that a transmission beam is unable to be determined according to the first DCI, and determining a default beam according to one or more transmission configuration indication (TCI) states corresponding to a second PDCCH;
   wherein the second PDCCH corresponds to a plurality of TCI states, comprising at least one of:
   the second PDCCH corresponding to at least one of one CORESET or one search space (SS) set associated with the CORESET, wherein the CORESET corresponds to a plurality of TCI states, and the plurality of TCI states corresponding to the second PDCCH are the plurality of TCI states corresponding to the CORESET;
   the second PDCCH corresponding to at least one of one CORESET or a plurality of SS sets associated with the CORESET, wherein the CORESET corresponds to a plurality of TCI states, and the plurality of TCI states corresponding to the second PDCCH are the plurality of TCI states corresponding to the CORESET; or
   the second PDCCH corresponding to at least one of a plurality of CORESETs or a plurality of SS sets, wherein each of the plurality of CORESETs corresponds to a TCI state, and the plurality of TCI states corresponding to the second PDCCH are the plurality of TCI states corresponding to the plurality of CORESETs.

2. The method of claim 1, further comprising:
   determining an absence of a TCI field in the first DCI, and determining that the transmission beam is unable to be determined according to the first DCI.

3. The method of claim 1, wherein determining the default beam according to the one or more TCI states corresponding to the second PDCCH comprises:
   determining one or more default TCI states according to the one or more TCI states corresponding to the second PDCCH; and
   determining the default beam according to the one or more default TCI states.

4. The method of claim 3, wherein determining the one or more default TCI states according to the one or more TCI states corresponding to the second PDCCH comprises:
   determining the one or more default TCI states according to IDs of the plurality of TCI states corresponding to the second PDCCH.

5. The method of claim 3, wherein determining the one or more default TCI states according to the one or more TCI states corresponding to the second PDCCH comprises:
   obtaining an attribute value of a CORESET corresponding to the second PDCCH; and
   determining the one or more default TCI states according to the attribute value of the CORESET corresponding to the second PDCCH.

6. The method of claim 5, wherein the attribute value of the CORESET comprises at least one of:
   a CORESET ID;
   an ID of a SS set associated with the CORESET; or
   a CORESETPoolindex of the CORESET.

7. The method of claim 3, wherein the one or more default TCI states comprise a plurality of default TCI states, and the method further comprises:
   mapping a plurality of default beams on a plurality of transmission occasions using sequence mapping or cyclic mapping.

8. The method of claim 1, wherein the second PDCCH corresponds to a TCI state, and the TCI state is a TCI state corresponding to a control resource set (CORESET) corresponding to the second PDCCH.

9. The method of claim 1, wherein the second PDCCH is the first PDCCH.

10. The method of claim 1, wherein a CORESET corresponding to the second PDCCH is a CORESET with a minimum ID in a latest time unit in which a search space (SS) set is monitored, and the one or more TCI states corresponding to the second PDCCH are one or more TCI states corresponding to the CORESET with the minimum ID.

11. The method of claim 10, further comprising at least one of:
   a CORESETPoolindex of the CORESET with the minimum ID being identical to a CORESETPoolindex of a CORESET corresponding to the first PDCCH; or
   the CORESET with the minimum ID being a CORESET with a minimum ID in a plurality of CORESETs each corresponding to one TCI state.

12. The method of claim 1, wherein the one or more TCI states corresponding to the second PDCCH comprise:
one or more TCI states corresponding to a designated codepoint of a TCI state field contained in a DCI format corresponding to the first DCI.

13. The method of claim 12, wherein the designated codepoint comprises one of:
a minimum codepoint in a plurality of codepoints;
a minimum codepoint in a plurality of codepoints each corresponding to a TCI state; and
a minimum codepoint in a plurality of codepoints each corresponding to two TCI states.

14. The method of claim 1, wherein the one or more TCI states corresponding to the second PDCCH comprise:
one or more TCI states indicated by a second DCI latest used to indicate the TCI state, wherein the second DCI is carried by the second PDCCH.

15. A non-transitory computer storage medium having stored thereon instructions that, when executed by a processor of a terminal device, cause the terminal device to perform the method of claim 1.

16. A method for determining a default beam, performed by a network device, the method comprising:
sending first downlink control information (DCI) to a terminal device, wherein the first DCI is carried on a first physical downlink control channel (PDCCH); wherein
the terminal device determines that a transmission beam is unable to be determined according to the first DCI, and the terminal device determines a default beam according to one or more transmission configuration indication (TCI) states corresponding to a second PDCCH,
wherein the second PDCCH corresponds to a plurality of TCI states, comprising at least one of:
the second PDCCH corresponding to at least one of one CORESET or one search space (SS) set associated with the CORESET, wherein the CORESET corresponds to a plurality of TCI states, and the plurality of TCI states corresponding to the second PDCCH are the plurality of TCI states corresponding to the CORESET;
the second PDCCH corresponding to at least one of one CORESET or a plurality of SS sets associated with the CORESET, wherein the CORESET corresponds to a plurality of TCI states, and the plurality of TCI states corresponding to the second PDCCH are the plurality of TCI states corresponding to the CORESET; or
the second PDCCH corresponding to at least one of a plurality of CORESETs or a plurality of SS sets, wherein each of the plurality of CORESETs corresponds to a TCI state, and the plurality of TCI states corresponding to the second PDCCH are the plurality of TCI states corresponding to the plurality of CORESETs.

17. A terminal device, comprising:
a transceiver;
a memory; and
a processor connected to the transceiver and the memory, respectively, wherein the processor is configured to:
receive first downlink control information (DCI) carried on a first physical downlink control channel (PDCCH); and
determine that a transmission beam is unable to be determined according to the first DCI, and determine a default beam according to one or more transmission configuration indication (TCI) states corresponding to a second PDCCH,
wherein the second PDCCH corresponds to a plurality of TCI states, comprising at least one of:
the second PDCCH corresponding to at least one of one CORESET or one search space (SS) set associated with the CORESET, wherein the CORESET corresponds to a plurality of TCI states, and the plurality of TCI states corresponding to the second PDCCH are the plurality of TCI states corresponding to the CORESET;
the second PDCCH corresponding to at least one of one CORESET or a plurality of SS sets associated with the CORESET, wherein the CORESET corresponds to a plurality of TCI states, and the plurality of TCI states corresponding to the second PDCCH are the plurality of TCI states corresponding to the CORESET; or
the second PDCCH corresponding to at least one of a plurality of CORESETs or a plurality of SS sets, wherein each of the plurality of CORESETs corresponds to a TCI state, and the plurality of TCI states corresponding to the second PDCCH are the plurality of TCI states corresponding to the plurality of CORESETs.

18. The terminal device of claim 17, wherein the processor is further configured to:
determine an absence of a TCI field in the first DCI, and determine that the transmission beam is unable to be determined according to the first DCI.

19. The terminal device of claim 17, wherein the processor is further configured to:
determine one or more default TCI states according to the one or more TCI states corresponding to the second PDCCH; and
determine the default beam according to the one or more default TCI states.

* * * * *